United States Patent [19]

Fuchsberger et al.

[11] Patent Number: 4,825,297
[45] Date of Patent: Apr. 25, 1989

[54] METHOD OF AND APPARATUS FOR ELECTRONIC CONTRAST ENHANCEMENT OF REPRODUCTIONS OF TWO-DIMENSIONAL TRANSPARENT ORIGINAL IMAGES

[75] Inventors: Hermann Fuchsberger, Ismaning; Eduard Wagensonner, Aschheim, both of Fed. Rep. of Germany

[73] Assignee: AGFA-Gevaert Aktiengesellschaft, Leverkusen, Fed. Rep. of Germany

[21] Appl. No.: 85,865

[22] Filed: Aug. 14, 1987

[30] Foreign Application Priority Data

Aug. 29, 1986 [DE] Fed. Rep. of Germany ....... 3629409

[51] Int. Cl.$^4$ .................. H04N 1/40; H04N 1/46; H04N 5/14; H04N 9/64
[52] U.S. Cl. ................................. 358/284; 358/36; 358/37; 358/75; 358/80; 358/166; 358/167; 358/280
[58] Field of Search ............... 358/75, 80, 27, 28, 358/29, 29 C, 36, 37, 39, 40, 76, 78, 166, 167, 280, 284

[56] References Cited

U.S. PATENT DOCUMENTS

| 3,715,477 | 2/1973 | Olson et al. | 358/36 |
| 4,009,334 | 2/1977 | Sypula | 358/36 |
| 4,245,237 | 1/1981 | Lagoni | 358/36 |
| 4,365,266 | 12/1982 | Lagoni | 358/36 |
| 4,626,903 | 12/1986 | Giesche et al. | 358/80 |
| 4,661,843 | 4/1987 | Sekizawa et al. | 358/80 |
| 4,689,666 | 8/1987 | Hatanaka | 358/36 |

FOREIGN PATENT DOCUMENTS

0123701 11/1984 European Pat. Off. .
0168818 1/1986 European Pat. Off. .

Primary Examiner—James J. Groody
Assistant Examiner—Randall S. Svihla
Attorney, Agent, or Firm—Peter K. Kontler

[57] ABSTRACT

The invention relates to a method and apparatus for electronic contrast valuation of two-dimensional transparent original images, in which the original images are electro-optically scanned by rows and columns. The image signals, corresponding to the image elements or pixels, and possibly needing correction, are subjected to frequency filtering, in which they are modified by a low-pass filter. The resulting low-pass signals are summed with corresponding high-pass signals obtained by subtraction of low-pass signals from the original image signals. The amplification factor for the high-pass signal is determined according to a non-linear transfer characteristic function K2, such that small signals corresponding to low image contrast are more greatly amplified (amplification $S_1$) than are large signals corresponding to high image contrast (amplification $S_2$), and that the low-pass signals are modified according to a non-linear gradation characteristic function K1 prior to the addition of the high-pass and low-pass signals.

9 Claims, 7 Drawing Sheets

METHOD OF AND APPARATUS FOR ELECTRONIC CONTRAST ENHANCEMENT OF REPRODUCTIONS OF TWO-DIMENSIONAL TRANSPARENT ORIGINAL IMAGES

BACKGROUND OF THE INVENTION

The invention relates generally to a method and apparatus for electronic contrast valuation of two-dimensional transparent original images, in which the original images are electro-optically scanned by rows and columns, and, more particularly, to a method and apparatus in which the image signals, corresponding to the image elements or pixels, and possibly needing correction, are subjected to frequency filtering in a low-pass filter. The resulting low-pass signals are summed with corresponding high-pass signals obtained by subtraction of low-pass signals from the original image signals.

A method of this kind is known in principle in the video art. It is known generally that one can use electronic means to achieve an enhanced or improved image. In particular, methods have been described for eliminating high-frequency noise signals, while high-frequency image signals corresponding to high local frequencies are accentuated by amplification. One can thereby achieve, on the hand, a picture smoothing, and, on the other hand, a sharpening of the image.

The fundamentals of these methods are described in detail in the books *Digital Bildverarbeitung*, by F.M. Wahl, Springer-Verlag publishing house, Berlin/-Heidelberg/New York, Tokyo, 1984, and *Digital Image Processing*, by W. K. Pratt, John Wiley & Sons, New York/Chicester/Brisbane/Toronto, 1978.

OBJECTS AND SUMMARY OF THE INVENTION

In connection with the reproduction of original color pictures (positive-positive) or in connection with the production of color photographic pictures from color negative originals, there is increasing reliance on electronic image processing, see for example European Patent Application Nos. 123,701 an 168,818. European Patent Application No. 168,818 corresponds to U.S. Pat. No. 4,661,843.

Basically, the original image is electro-optically sampled or scanned by lines and columns, and the resulting image signals are modified according to specific criteria. The scanning of the original image is normally done serially for the three primary colors red, green, blue (RGB).

Experience has shown that, for production of optimal positive images, the following image parameters must be adjusted or be capable of being adjusted:
 (a) color balance,
 (b) color saturation,
 (c) global contrast (gradation).
There is often the difficulty that these parameters cannot be adjusted independently of one another. When one adjusts the gradation, one finds that, for example, the position of the color balance has changed. Nevertheless, an independent adjustment can be carried out when the brightness-linear image signals are transformed into luminance and chrominance signals, as is usual in the television art (the so-called RGB-to-YUV transformation).

In addition to adjustment of gradation, there are known, as described above, electronic methods for image enhancement, in which normally image signals corresponding to high local frequencies are accentuated, in order to compensate for the transfer losses which set in at high local frequencies in accordance with the modulation transfer function (MTF). In this manner, one can, in principle, improve the reproduction of microstructures in the image. It has been shown that, in order for the images to be classified as optimal by an observer, the production of color photographic prints from color negatives or color positives must satisfy special criteria, some of which relate to physiology. In particular, it has been shown that high-frequency detail structures (microstructures) must be differently evaluated or treated during the image processing than low-frequency structures (macrostructures).

This is where the present invention comes in. It is intended to solve the problem of enchancing the image contrast in the microstructures (image sharpness), and thereby to avoid overmodulation of the contrasts, which in practice often leads to a "straw-like" impression.

This object is achieved by improving the method described in the introduction, in accordance with the invention, by employing in the filter circuit an amplification factor K2 which corresponds to a non-linear characteristic curve, by greater amplification of small, low-contrast signals than of strong, high-contrast signals, and by modifying, according to a non-linear gradation characteristic curve, the low-pass signals prior to summation of the high-pass and low-pass signals, with reference to the modulation range. The signal-dependent amplification in the high-pass channel results in relatively strongly accentuated small detail contrast in the image, while the a priori greater contrasts are more weakly amplified. In this manner, both over-modulation and over-emphasis of contrasts can be avoided.

Preferably, very small image signals corresponding to the average noise signals are suppressed in the high-pass channel by a characteristic curve K2 which runs flat or horizontal near the zero-point. In this manner, one can eliminate both internal system electronic noise and external noise deriving from the graininess of the original image.

In order to take into account the fact that the eye reacts differently to jumps from bright to dark than to jumps from dark to bright, it is preferable to employ an asymmetrical characteristic curve for the amplification of the high-pass image signal. The noise-suppression threshold $T_1$ and the initial slope $S_1$ in the first quadrant are smaller than the noise-suppression threshold $T_2$ and the initial slope $S_2$ in the third quadrant of the amplification characteristic curve K2.

An additional advantageous variation is to switch between various amplification characteristic curves K2, depending upon the gradation-weighted low-pass signal.

This variation requires, to be sure, a greater commitment of circuitry, but permits a greater adjustment range in matching of the image processing algorithm to the physiological characteristics of the eye. One can, for example, take into account that the contrast sensitivity of the eye is greatest in the middle brightness range, and is relatively small at high brightness and low brightness. Accordingly, one can switch over to an amplification characteristic curve K2 with steeper slope when average brightness is either very small or very large.

One can achieve a subjectively still better image quality if the low-pass filtering function is so varied in accordance with the signal amplitude at the filter input that the low-pass filter has a narrow bandwidth at low image signal levels and a broad bandwidth a high image signal levels.

An apparatus for implementing the method just described will be set forth below.

The novel features which are considered as characteristic of the invention are set forth in particular in the appended claims. The improved contrast enhancement method, as well as the construction and mode of operation of the improved contrast enhancement apparatus, together with additional features and advantages thereof, will, however, be best understood upon perusal of the following detailed description of certain specific embodiments with reference to the accompanying drawing.

DESCRIPTION OF THE PREFERRED EMBODIMENTS

Figure 1:
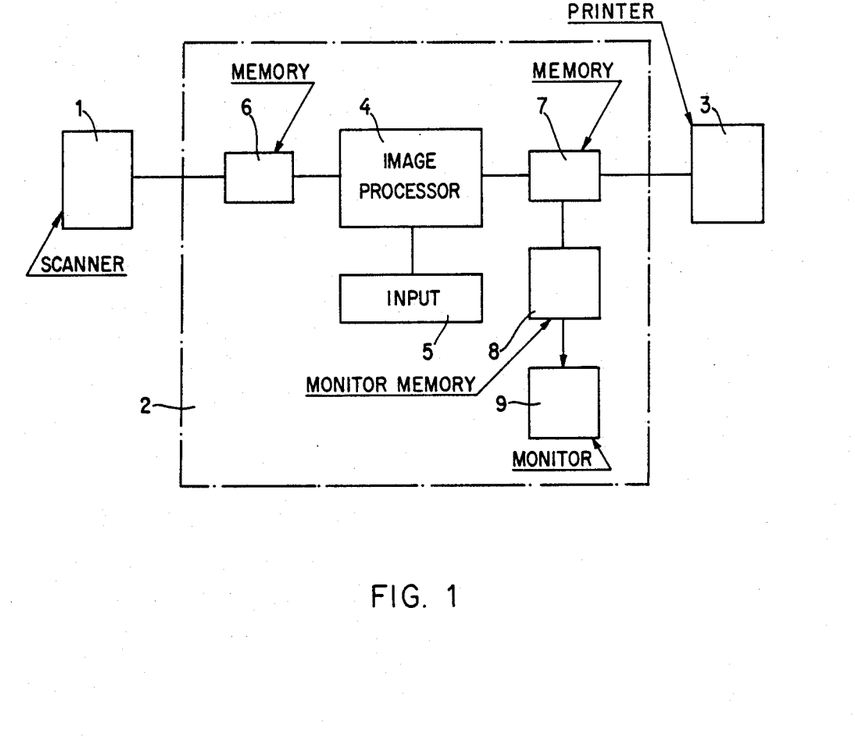
FIG. 1 shows the three main elements of an image processor, namely the image sampling apparatus or scanner, the actual image processing portion, and the image output apparatus (printer)

As shown in FIG. 1, the original image is sampled along vertical lines with a scanner 1, a CCD (Charge Coupled Device) line sensor oriented along a horizontal line, so that an electronic image signal is generated for every image point or pixel. The sampling is done sequentially for the three primary colors red, green, blue (RGB). For this purpose, special color filters are pivoted into the light path between the CCD line sensor and the original image. The electro-optically sampled image comprises 2048 image points per line (horizontal) and 1024 lines (vertical), so that each image has in the aggregate 2048×1024 image elements (pixels), to each of which are assigned three primary color values RGB. A correction circuit (not shown) assures that CCD-specific defects, e.g. differing sensitivities of the CCD elements and dark current photocells, are eliminated. The corrected image signals are thereafter digitized. Only then does the actual electronic image processing occur, as summarized in FIG. 1 in the dashed-line block 2.

The last element in the large processing chain is the image output device 3, here a cathode ray printer, which transforms the electrical image signals back into an optical image, which then exposes the photographic recording material, e.g. color positive paper. The significant feature is that, in the printer, the optical image is built up point-for-point by transformation of the electrical image signals. Therefore, in principle, one can subject each pixel to image processing and then output it at coordinates on the recording medium corresponding to its coordinates on the original image. The actual electronic image processing occurs in an image processor 4 which can be externally controlled over an input 5. Upstream and downstream of the image processor 4, the image is stored in respective memories 6 and 7 (SP1 and SP2). These intermediate memories enable printer 3 to retrieve and plot an image from memory 7 while a new image is simultaneously being read into memory 6 and processed by image processor 4. The three basic steps of sampling (scanner 1), image processing in image processor 4, and image recording (printer 3) are thus decoupled. The image which has been processed in image processor 4 and is intended for recording can be placed in intermediate storage in a monitor memory 8 and displayed on a monitor 9. These blocks or steps are classified as part of image processing 2.

The present invention is directed primarily to special electronic measure for image matching and image enhancement, for which, in the final analysis, the evaluation criteria are the visual impression. Specifically, the image processor has the following tasks and functions:

(a) adjustment of the color balance,
(b) adjustment of the color saturation in multiple shades or steps,
(c) image-dependent adjustment of the gradation,
(d) image sharpening in areas of the fine image details (higher local frequencies).

Figure 2:
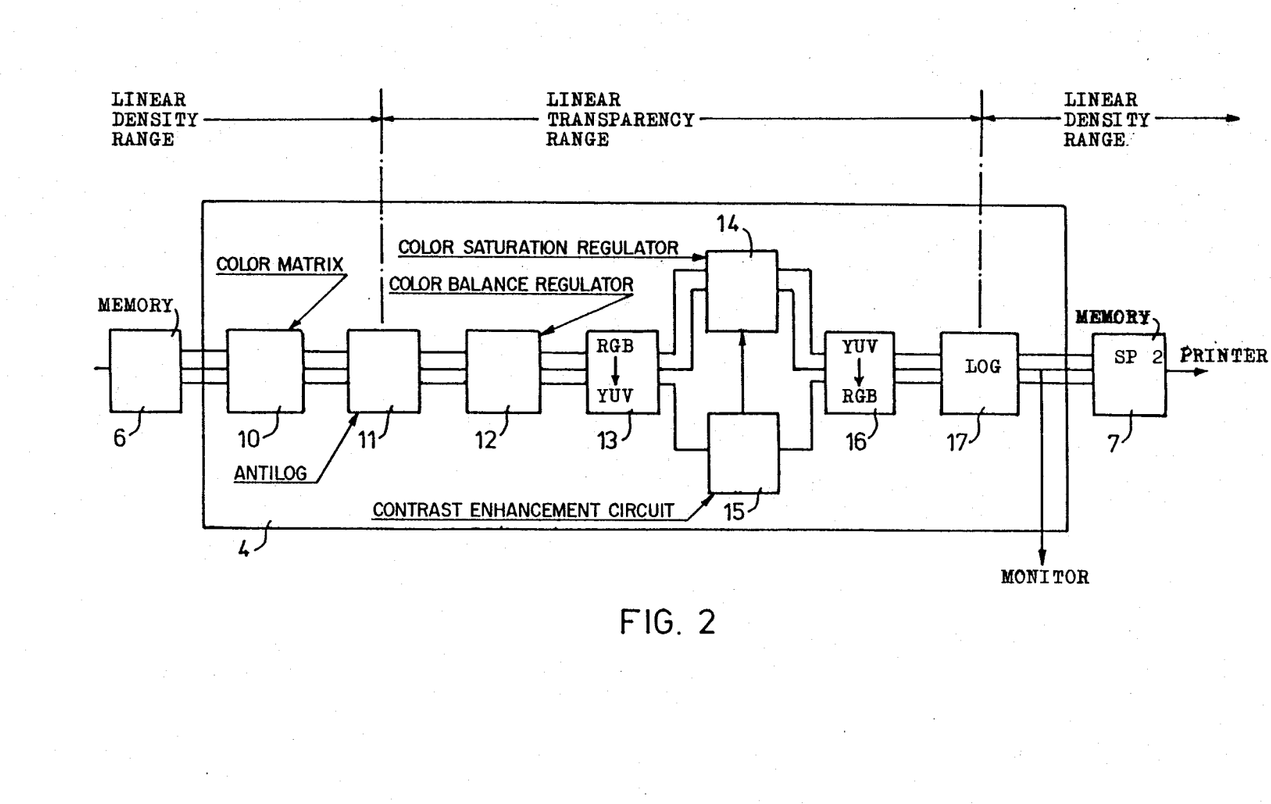
FIG. 2 is a schematic block diagram of the image processor in the image processing portion.

The image processing functions are explained in detail with reference to FIG. 2. An important feature is the image definition improvement in the area of high local frequencies (point d above). As shown in FIG. 2, the image processor encompasses elements 10 through 17. The image signals stored in image memory 6 (SPI) are fed to a color matrix 10, which serves to correct sidewise bleeding or slop-over of the dyes of the original images (cross-talk). The color matrix includes a permanent (e.g. ROM=Read-Only Memory) memory which contains a functional Look-Up Table (LUT) associating each original image signal A (x,y) with a corrected image signal A' (x,y). The aforementioned color corrections cannot be carried out before this point, because the image signals of all three color data RGB first become simultaneously available aftre memory 6. Subsequently, antilogarithms of the linear density stored imaged signals are taken, so that from this point on linear transparency image signals are available. With the color balance regulator 12, color deviations (e.g. color cast) which are not imposed by the system can be compensated or a deliberate deviation from the standardized gray scale can be achieved. In the following element 13, the RGB image signals are transformed into one color-independent brightness signal Y (luminance signal) and two brightness-independent color difference signals U, V (chrominance signals). The transformation is accomplished in the known manner according to the following equations:

$$Y = 0.3\,r + 0.6\,g + 0.1\,b$$

$$U = b - Y$$
$$V = r - Y.$$

This transformation presupposes linear transparency signals. By means of circuit 14, to which are fed only the chrominance signals U, V, the color saturation can be adjusted or predetermined or automatically set as a function of the luminance signal Y. The luminance signal Y is fed through the lower channel shown in FIG. 2 into the contrast enhancement circuit 15, which will be described below in greater detail. The modified chrominance and luminance signals are transformed back in element 16 into corresponding RGB-signals according to the inverse function of the aforementioned equations. The logarithms of these RGB signals are then taken, so that in the following signal processing, linear density image signals are provided.

Figure 3:
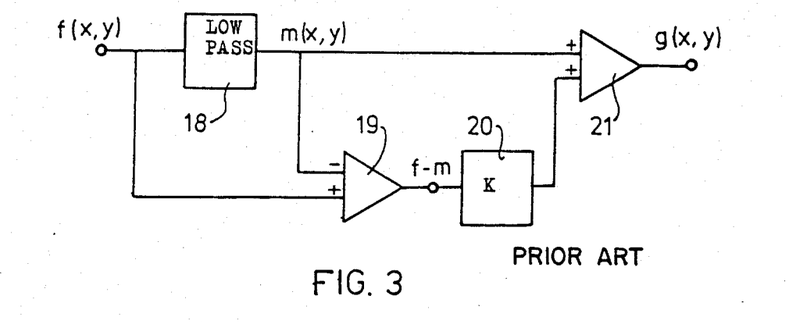
FIG. 3 illustrates the principal components of an electronic filter, in accordance with the prior art.

Contrast enhancement circuit 15 is, in principle, a two-dimensional digital filter for accentuating or suppressing specific local frequency ranges in the image. It relates to the known filter principle of FIG. 3, in which the image signals f(x,y) are fed through a low-pass filter 18, the resulting low-pass signals m(x,y) are subtracted from the original image signals f(x,y) in a differential amplifier 19 to form high-pass signals f−m, which are thereafter amplified (20) and finally combined in a summing circuit 21 with low-pass signals m(x,y) again. The resulting output signal is here designated g(x,y). The associated mathematical formula reads:

$$g(x,y) = m(x,y) + K \cdot [f(x,y) - m(x,y)]$$

in which K is the weighting constant for the particular pixel. For digital signals, the low-pass filter 18 is a matrix filter. This matrix filter is so constructed that each pixel is assigned a value which is a middle or average value of the immediately surrounding image signals. This corresponds to a window in local space, within which the original image provides a sampling value by means of averaging. The averaging is done over, for example, 3×3, 5×5, or 7×7 image elements. Thus, an average value is assigned to each image element; i.e., the window is electronically moved through the local space.

Using the amplification factor K of linear amplifier 20, the amplification of the frequency components corresponding to fine image structures can be continuously or steplessly adjusted. The aggregate result in contast enhancement of the fine (high-frequency) image structures. Upon strong contast enhancement of the high-frequency image structures, there results, however, a "straw-like" visual impression, because structures with relatively great contrast experience an over-emphasis or over-modulation.

A further disadvantage is that stochastic disturbance signals, i.e. optical noise, noise due to graininess of the original image, or internal system-generated electronic noise, are handled according to the same basic process as the image signals.

Generally, in electronic image processing, all of the image signals in an image are valued or weighed according to one gradation characteristic line, in order to optimally match the contrasts to the gradation of the photographic recording medium. This characteristic line has a generally S-shape. The associated circuit is normally disposed (see FIG. 2) before and after the filter circuit of FIG. 3. The result of this is that the high-frequency detail structures (microstructures) are handled, with respect to gradation, just like the low-frequency gross structures, which are significant for the assessment of overall contrast (global contrast). This expresses itself particularly strongly in flat areas of the gradation characteristic line, if the contrast valuation is downstream or subsequent to the filtering. It is evident that the high-frequency microstructures, whose contrasts were enhanced with the filter, will then be damped or suppressed again, and the filtering effect will be partially lost again. This is the basis for the need for separate signal processing paths for the respective image signals which specify the microcontrasts, on the one hand, and the global contrast relations, on the other hand.

Figure 4:
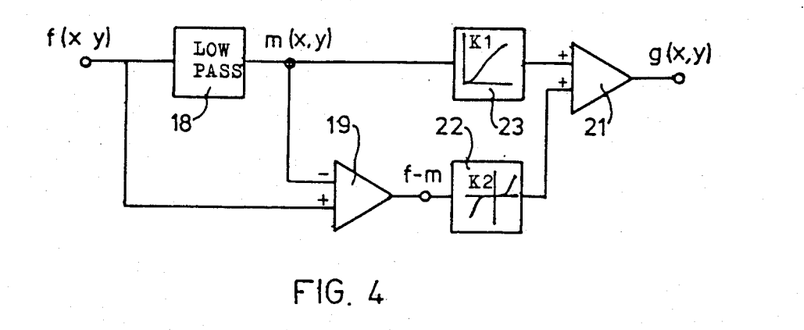
FIG. 4 illustrates the principal components of the improved electronic filter of the present invention.

Based on these considerations, the present invention was developed, modifying the filtering system of FIG. 3 to obtain the improved filter structure shown in FIG. 4. This filter structure is particularly adapted for digitized one- and two-dimensional image signals (corresponding to the x,y coordinates of the original images). The same filtering principle may, however, also be applied to analog signals.

A significant difference over the filter system of FIG. 3 is that the high-pass signal f−m is weighted or valued according to a non-linear characteristic, described in greater detail below, and that, independently therefrom, the low-pass signal m(x,y) is subjected to contrast valuation or enhancement. For this purpose, there are provided a non-linear transfer element 22 in the high-pass channel, and a contrast weighting circuit 23, with e.g. an S-shaped characteristic, in the low-pass channel. The corresponding filter equation is:

$$g(x,y) = K1 \cdot m(x,y) + K2 \cdot [f(x,y) - m(x,y)]$$

where
  g(x,y) = the filter output signal,
  f(x,y) = the filter input signal,
  m(x,y) = the low-pass signal,
  f(x,y) − m(x,y) = the high-pass signal,
  K1 = the characteristic for weighting of the low-pass signal, and
  K2 = the characteristic for weighting of the high-pass signal.

Figure 5A:
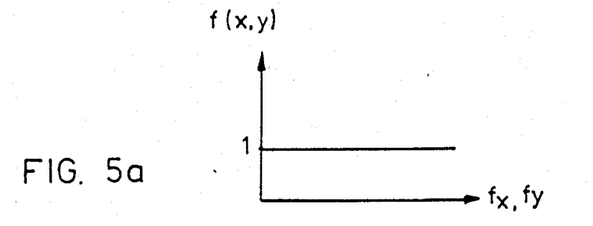
FIGS. 5a-5d are diagrams explaining th filtering function.
Figure 5B:
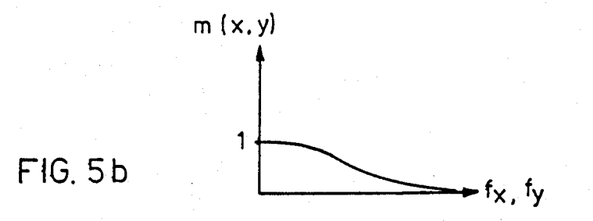
Figure 5C:
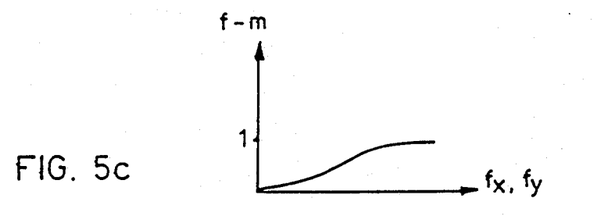
Figure 5D:
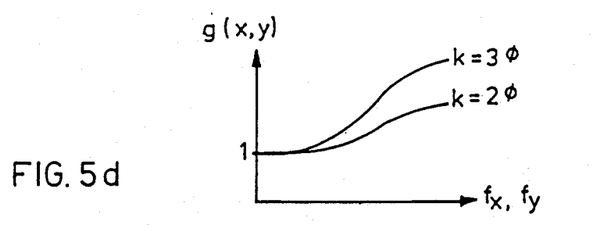

FIGS. 5a through 5d illustrate the principal frequency relationship of the individual signal components. In the diagrams, the signal amplitudes are given as a function of the local frequencies $f_x$ and $f_y$. For the sake of simplicity, it is assumed that the input signal provides all frequencies at the same amplitude in both the x-direction and the y-direction (FIG. 5a). The low-pass filter then causes the amplitude of the image signals to fall as high frequencies are approached (FIG. 5b), while the high-pass signal f−m, being the difference between the curves of FIGS. 5a and 5b, describes the course shown in FIG. 5c. FIG. 5d shows the resulting filter output signal g(x,y) which results from the summation of the low-pass signal and the the weighted (by amplification) high-pass signal (amplificiation factors 2 or 3).

Figure 6:
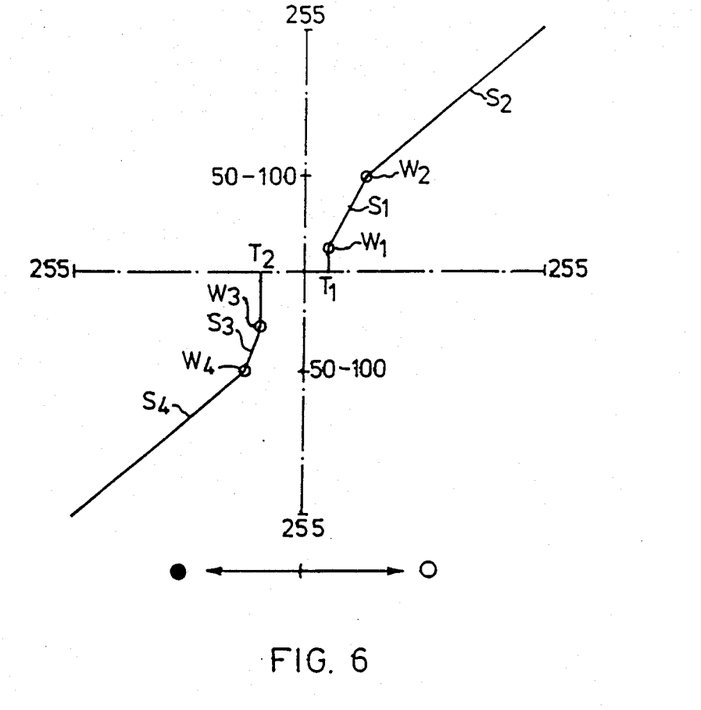
FIG. 6 illustrates the non-linear amplification characteristic curve K2 for the high-pass channel.

As previously noted, the non-linear transfer characteristic curve K2 of circuit 22 in the high-pass channel, as shown in FIG. 4, has special significance. The characteristic of this curve will be explained with reference to FIG. 6. Since the high-pass signal may be regarded as a high-frequency modulation of the low-pass sigal and the low-pass signal corresponds to an average or middle image brightness, the zero-point of the characteristic curve K2 is at an average image brightness associated with the respective low-pass signal. Grossly simplified, the negative amplitudes and the positive amplitudes shown in ths illustration correspond respectively to the dark and the bright portions of the image. The transfer relationship of this non-linear characteristic is such that smaller signals, corresponding to low modulations and image contrasts, are more greatly amplified than large modulation signals corresponding to already-large, relatively strong contrasts. This criterion applies equally for dark and for light image regions. In FIG. 6, this means:

Slope S1 > Slope S2 and

Slope S3 > Slope S4.

Further, characteristic curve K2 does not begin at the origin, but rather only at a threshold value $T_1$ or $T_2$. In this manner, the aforementioned high-frequency noise signals, which are either of an optical or an electrical nature, can be suppressed. The threshold $T_1$ is at about 3% of the full modulation range. The value 255 for full modulation corresponds to the highest value which can be represented with 8-bits.

In order to take into account the fact that the human eye perceives a light-dark contrast differently than the corresponding dark-light contrast with identical modulation depth, a different characteristic curve is used in the negative region (third quadrant) of characteristic K2 than in the first quadrant. Thus, if rotated about the origin, one of the lines in FIG. 6 would not fit exactly over the other one.

The amplification of the high-pass signals, which is decisive for the contrast valuation of the microstructures, is therefore asymmetric for positive and negative signal amplitudes, with respect to the middle brightness value or zero-point of the brightness axis. The asymmetry is such that, firstly, the threshold value $T_2$ for noise suppression for negative amplitudes is greater than the threshold value $T_1$ for positive amplitudes, and secondly, the initial slope of the characteristic curve is different. Further, the slope $S_3$ of the second characteristic curve segment in the third quadrant is greater than the slope $S_1$ of the corresponding second characteristic curve segment in the first quadrant. However, the slopes of the characteristic curve segments for relatively large signal amplitudes agree relatively closely. As shown in FIG. 6, the characteristic curve segments in the two quadrants can each comprise three straight segments. The first segment is a short vertical rise at the threshold $T_1$ or $T_2$, respectively. Thereafter follow, respectively, the segments with slopes $S_1$ and $S_2$, or $S_3$ and $S_4$. The characteristic for positive and negative signal amplitudes may again be expressed in tabular form as:

$S_1 > S_2$; $S_3 > S_1$ $S_3 > S_4$; $S_4 \approx S_2$ $|T_1| < |T_2|$ with $T_1 = 5$ to 10; $T_2 = 10$ to 20 (measured on the abscissa)
$W_1$ about 5 to 10 measured on the ordinate;
$W_2$ about 50 to 100 measured on the ordinate;
$W_3$ about 10 to 20 measured on the ordinate;
$W_4$ about 50 to 100 measured on the ordinate.
Instead of a characteristic curve with discrete slope segments, a steadily curved characteristic line can be used, whose slope, beginning at small amplitudes, continuously decreases. In terms of circuitry, characteristic curve K2 can be implemented again with a (two-dimensional) Look-Up Table (LUT for short). This has the advantage that any desired characteristic can be programmed in, and a successive empirical adaptation toward optimal image quality can be carried out. By means of these contrast enhancement measures in the high-pass channel and the separate global contrast valuation on the basis of an S-shaped characteristic curve K1 in the low-pass channel, a substantial improvement of image quality can be achieved in recording onto color photographic material.

Figure 7:
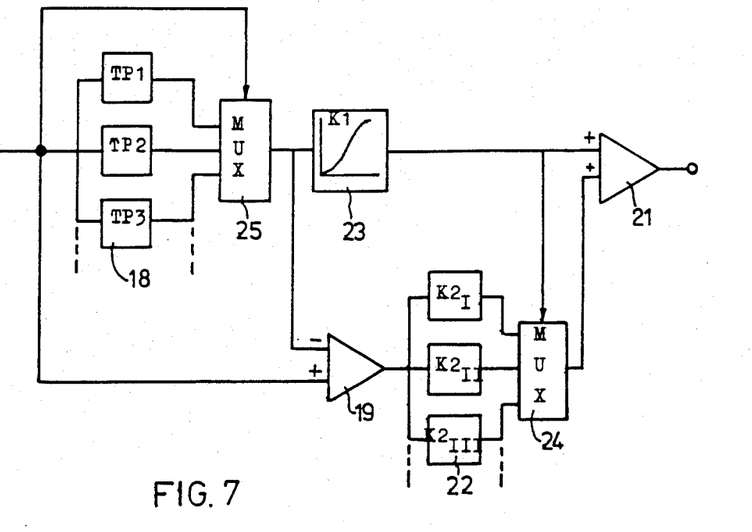
FIG. 7 illustrates schematically a filter with improved adaptation or matching features.

A further improved, albeit technically more complicated, variation of the filter system is shown in FIG. 7. This circuit permits switching among various characteristic curves $K2_I$, $K2_{II}$, $K2_{III}$ in the high-pass channel, in dependence upon the gradation-valued low-pass signal with the aid of a multiplexer 24. This circuit offers a greater degree of freedom for obtaining the optimal contrast valuation in the high-pass channel. Thus, in accordance with the contrast sensitivity of the human eye, the characteristic curve $K2_I$ is used in image portions with a relatively large average brightness, and, when the average image brightness and thus the low-pass signal decrease from high to low values, a switch is made by means of multiplexer 24 to characteristics $K2_{II}$ or $K2_{III}$ (see FIG. 8).

Figure 8:
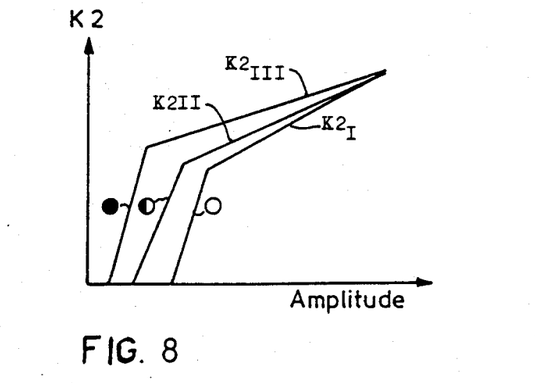
FIG. 8 illustrates the amplification characteristic curves K2 on which the filter of FIG. 7 in the high-pass channel is based.

Since the physiological contrast sensitivity is greatest at average brightness and declines toward both sides, larger values are chosen for the slopes, in the low-contrast segment, of both characteristic curve $K2_I$ (bright) and characteristic curve $K2_{III}$ (dark) than the slope of characteristic curve $K2_{II}$ (medium brightness). It is apparent that, in this manner, a particularly targeted contrast enhancement of fine image details (microstructures) is possible.

In addition, the circuit of FIG. 7 provides a further development in the low-pass channel. With the aid of a multiplexer 25 in the low-pass channel, the low-pass filter function can be modulated in dependence upon the signal amplitude at the filter input. In this connection, it has been empirically shown that one can further improve the optical image quality if one uses a low-pass filter TP1 with narrow bandwidth at relatively small input signals and switches, with rising image sigals, stepwise to low-pass filters TP2 and TP3 having successively greater bandwidths.

For implementation of the filter matrix for the low-pass filter, a larger filter extent is often necessary. The thus-created hardware demand can, however, be limited if one uses, rather than a filter matrix with a large number of elements, a filter matrix with a small number of elements and intermediate storage to permit the summation output signal g(x,y) to recursively feed through the whole filtering circuit. In this manner, with e.g. a 3×3 filter matrix and Q passes through the filter, one an simulate an L x L-large filter matrix, where Q and L are related by the equation:

$Q = L - 1/2$ e.g. $Q = 7 - 1/2 = 3$ passes through a 3×3 filter is effectively a 7×7 matrix. The matrix coefficients can either be constant or can be varied for each pass through the filter so that the desired filtering function is optimally achieved. The image being processed must be stored after each pass through the filter in an image memory. This is referred to below as iterative image processing.

Figure 9:
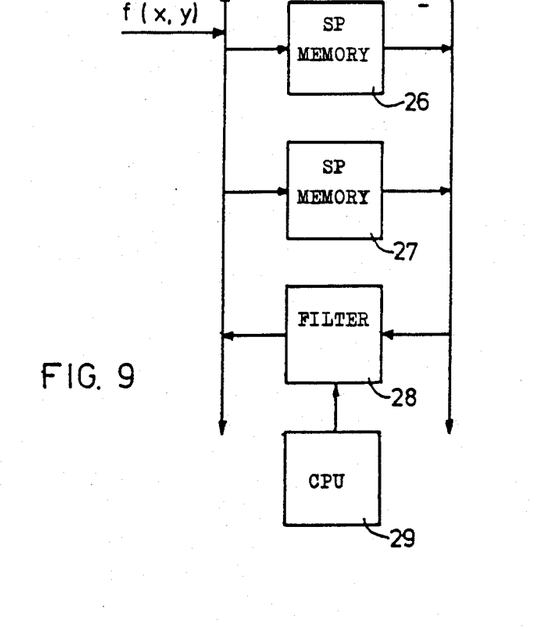
FIG. 9 illustrates the principle of iterative filtering using image memory or storage.

FIG. 9 shows an apparatus with which such iterative image processing can be carried out. The path of an image for a 7×7 filter (3 filtering passes) looks like this: Memory 26 to Filter 28 to Memory 27 to Filter 28 to Memory 26 to Filter 28 to Memory 27. With a computer (CPU) 29, the filter coefficients can be newly written in after each pass.

Figure 10:
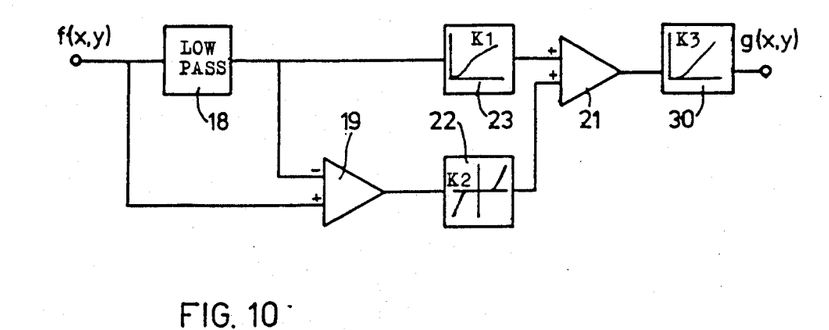
FIG. 10 illustrates the filtering process according to the method of the present invention, with additional modification of the filter output signal.

In the extended filter circuit shown in FIG. 10, a transfer element 30, which is preferably a Look-Up Table (LUT) memory, is connected to the output of the summing amplifier 21. With this transfer element, which is programmed with characteristic curve K3, the following operations can be carried out for the entire local frequency region after the matrix filtering:

Limitation of the output signal of summing amplifier 21,
linear shifting of image signals,
black-value, white-value adjustments,
gradatiom corrections.

To this is connected the local-frequency-dependent contrast valuation circuit in the luminance channel (box 15 in FIG. 2). The signals at the contrast valuation circuit 15 are then, as already described above on page 9, transformed back into RGB signals in element 16, and further processed in preparation for the electro-optic conversion in printer 3 (see FIG. 1).

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the instant contribution to the art and, therefore, such adaptations should and are intended to be comprehended within the meaning and range of equivalence of the appended claims.

What is claimed is:

1. In a method of electronic contrast enhancement of reproductions of two-dimensional transparent original images in which the original images are scanned along rows and columns, and original image signals corresponding to image elements of the original images are subjected to frequency filtering in a low-pass filter and in which the resulting low-pass signals are added to high-pass signals obtained by subtracting said low-pass signals from said original image signals, the improvement comprising: providing a non-linear transfer characteristic curve K2; amplifying said high-pass signals in accordance with said characteristic curve K2 in such a manner that smaller signals corresponding to lower image contrasts are amplified more (slope S1) than larger signals corresponding to higher image contrasts (slope S2); and modifying said lowpass signals according to a non-linear gradation characteristic curve K1 before the addition of said high-pass and low-pass signals.

2. The method of claim 1, wherein said amplifying step comprises suppressing small signals in said high-pass signals corresponding to noise signals by providing said characteristic curve K2 with a value of zero near its zero point.

3. The method of claim 1, wherein said characteristic curve K2 is asymmetric about the origin of a graph on which it is plotted, and wherein a noise suppression threshold T1 and an initial slope S1 of said characteristic curve K2 in a first quadrant of said graph are smaller than a noise suppression threshold T2 and an initial slope S2 of said characteristic curve K2 in a third quadrant of said graph.

4. The method of claim 1, wherein said characteristic curve K2 is selected from a plurality of characteristic curves K2 in dependence upon said modified low-pass signals.

5. The method of claim 1, wherein the bandwidth of said low-pass filter is modified in dependence upon the amplitudes of said original image signals such that at low amplitudes said low-pass filter has a narrow bandwidth and at high amplitudes said low-pass filter has a broad bandwidth.

6. The method of claim 1, wherein said frequency filtering is performed by using a filter matrix having a relatively small number of filter elements as said low-pass filter and using intermediate storage to send said added high-pass and low-pass signals through said filter matrix a plurality of times, thereby simulating a low-pass filter with a filter matrix having a larger number of filter elements.

7. The method of claim 6, wherein said filter matrix has matrix coefficients and wherein the filtering characteristics of said low-pass filter are optimized by adjusting said matrix coefficients after each pass of said added high-pass and low-pass signals through said filter matrix.

8. Apparatus for carrying out the method of claim 1, comprising:
low-pass filter means (18) for filtering said original image signals to produce said low-pass signals;
a summing amplifier (19) having a first input connected to an output of said low-pass filter means (18) to receive said low-pass signals and a second input connected to receive said original image signals, said summing amplifier (19) producing said high-pass signals;
said low-pass filter means (18) and said summing amplifier (19) defining respectively a low-pass channel and a high-pass channel;
a respective non-linear element (22, 23) connected in each of said channels, said non-linear element (23) in said high-pass channel having said non-linear transfer characteristic curve K2, said characteristic curve K2 providing an output of zero for low values of said high-pass signals, thereby suppressing noise signals in said high-pass signals; and
a summing amplifier (21) connected to receive outputs of said non-linear elements (22, 23).

9. The apparatus of claim 8, wherein each of said non-linear elements comprises a look-up table (LUT).

* * * * *